UNITED STATES PATENT OFFICE.

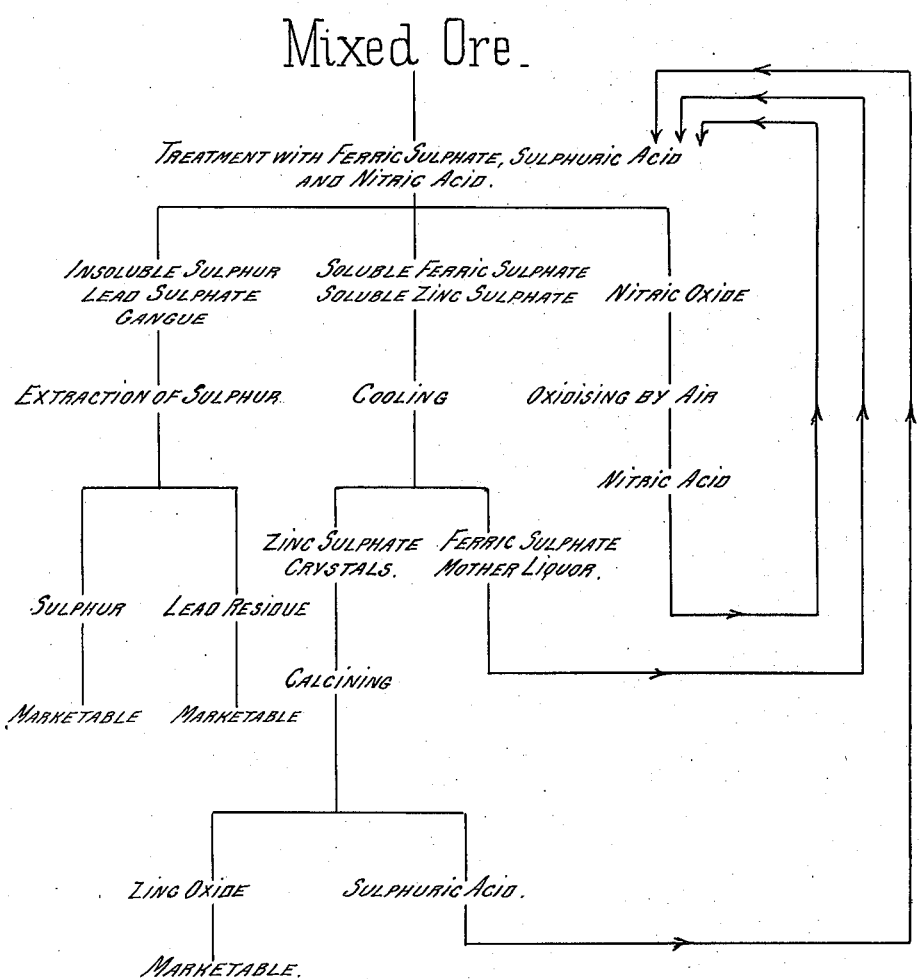

GUY DE BECHI, OF LONDON, ENGLAND.

PROCESS FOR THE INDUSTRIAL SEPARATION OF LEAD AND ZINC CONTAINED IN THE STATE OF SULFIDS IN ORES.

1,157,153.  Specification of Letters Patent.  Patented Oct. 19, 1915.

Application filed March 29, 1913. Serial No. 757,694.

*To all whom it may concern:*

Be it known that I, GUY DE BECHI, a subject of the King of Great Britain, residing at Forest Gate, London, England, have invented certain new and useful Improvements in Processes for the Industrial Separation of Lead and Zinc Contained in the State of Sulfids in Ores, of which the following is a specification.

It is known that the industrial separation of blende and galena in ores in which these substances are intimately mixed is very difficult and that the means for mechanical separation give only imperfect results.

This invention has for its object to effect the separation of the two metals chemically by transforming their sulfids into sulfates.

In the drawing, the entire process is illustrated diagrammatically.

In carrying out the process, the ore is first reduced to impalpable powder and is treated in suitable apparatus by a heated solution, at a suitable temperature, of ferric sulfate $Fe_2(SO_4)_3$ containing a suitable quantity of sulfuric acid and nitric acid, or nitrates.

Under the influence of ferric sulfate the sulfids of lead and of zinc are transformed into sulfates, the ferric sulfate being reduced to ferrous sulfate $FeSO_4$ according to the following equations:

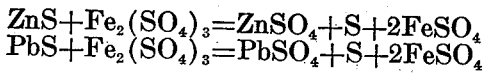

By virtue of the presence of sulfuric acid and nitric acid, the ferrous sulfate formed is transformed, as the reaction proceeds, into ferric sulfate with disengagement of nitric oxid according to the following equation:

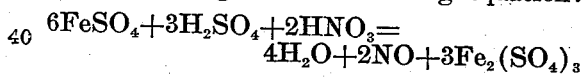

The nitric oxid evolved is again oxidized in suitable apparatus thus regenerating the nitric acid, which serves for a fresh operation. The transformation of the nitric oxid into nitric acid by means of water and air is an operation which is well known and takes place according to the equation:

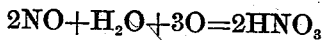

The liquid obtained by the reaction of the ferric sulfate on the sulfids contained in the treated ore, contains, in a soluble state, zinc, and in an insoluble state, lead sulfate as well as sulfur. Simple filtration in suitable apparatus allows of the separation of the lead and zinc. If the operation has been carried out with an already saturated solution of zinc sulfate, arising from a preceding operation, which is the case in practice, the zinc sulfate formed from the ore, crystallizes by cooling and can be separated by decanting, hydro extracting or filtering or in any other suitable manner. The mother-liquors serve for treating a fresh quantity of ore while, by calcining the zinc sulfate in suitable furnaces the sulfuric acid necessary for the reaction is regenerated as above described. The residue from the calcination of the zinc sulfate in the furnace is zinc oxid, free from lead, which is transformed into metallic zinc by known processes.

As to the insoluble part which remains upon the filter when treating the ore by ferric sulfate and which contains all the lead and sulfur, it is dried, and the sulfur is separated by distillation or by extraction with a suitable solvent. The final residue, which contains all the lead, and the precious metals, (should any be present) contained in the ore, is transformed in this case into argentiferous and auriferous lead by the usual metallurgical processes.

The above described process does not require other reagents than those obtained from the ore itself with the exception of those required to replace the slight loss of acids inherent to all industrial processes and which may be replaced at small cost during the operations.

What I claim is:

1. A process for the industrial separation of lead and zinc contained in the state of sulphids in ores consisting in reducing the ore to an impalpable powder, treating said powder by a mixture of ferric sulfate, sulfuric acid and nitric acid, whereby the sulfids are transformed into sulfates with formation of free sulfur, and separating the zinc solution from the lead sulfate by filtration.

2. A process for the industrial separation of lead and zinc contained in the state of sulfids in ores, consisting in reducing the ore to an impalpable powder, treating said powder by a mixture of ferric sulfate, sulfuric acid and nitric acid, whereby the sulfids are transformed into sulfates with formation of free sulfur, separating the zinc sulfate from the lead sulfate by filtration, and regenerating the sulfuric acid of the zinc sulfate.

3. A process for the industrial separation of lead and zinc contained in the state of sulfids in ores, consisting in reducing the ore to an impalpable powder, treating said powder by a mixture of ferric sulfate, sulfuric acid and nitric acid, whereby the sulfids are transformed into sulfates with formation of free sulfur, separating the zinc sulfate from the lead sulfate by filtration, regenerating the sulfuric acid of the zinc sulfate, and extracting the sulfur from the insoluble residue.

4. The process of extracting lead and zinc from ores, comprising reducing the ores to a fine powder, and subjecting said powder to the action of a ferric salt solution containing nitric acid, whereby said ferric salt is maintained oxidized during the extraction of the ore.

In testimony whereof I have affixed my signature in presence of two witnesses.

GUY DE BECHI.

Witnesses:
  JAQUES BEDE,
  CHAS. ROY NASMITH.